United States Patent Office 3,451,962
Patented June 24, 1969

3,451,962
PROCESS FOR IMPROVED SULFUR-VULCANIZATION OF MIXTURES OF ELASTOMERS CONTAINING ETHYLENE PROPYLENE TERPOLYMERS
Hans W. Auler and Gerhard Proske, Stolberg, Germany, assignors to Englebert Aktiengesellschaft, Aachen, Germany, a corporation
No Drawing. Filed Apr. 28, 1966, Ser. No. 551,834
Claims priority, application Germany, May 14, 1965, E 29,298
Int. Cl. C08c 9/08; C08f 29/10
U.S. Cl. 260—33.6    6 Claims

ABSTRACT OF THE DISCLOSURE

EPDM can be co-vulcanized in blends with highly unsaturated elastomers (e.g., NR, SBR, etc.), in spite of the wide discrepancy in curing rates between these two types of elastomers, by using a delayed action accelerator (e.g., sulfenamide type, especially in combination with diphenylguanidine), preferably along with a retarder. With such an accelerating system, the deterioration in physical properties (dilution effect), usually noticed upon vulcanization of a fast-curing highly unsaturated elastomer blended with increasing amounts of slow-curing EPDM, is avoided.

---

It is known that ethylene propylene terpolymers (EPDM) may be vulcanized with sulfur and accelerators. EPDM refers to the known unsaturated terpolymers of ethylene, propylene and a third more strongly unsaturated component as, for example, dicyclopentadiene, hexadiene, methylene norbornene, cyclo-octadiene, various borneol derivatives and other compounds with at least two double bonds, usually non-conjugated diolefins in the amount of not more than 10 mole percent. Vulcanizates prepared from EPDM have high aging resistance and good fatigue properties. EPDM is, in comparison to other elastomers, relatively cheap. However, EPDM compounds and resulting vulcanizates which contain EPDM as the sole elastomer also display a series of poor characteristics. The compounds vulcanize relatively slowly in comparison to other elastomers so that relatively long curing times are required to obtain optimum physical-mechanical properties. This slow curing rate is noticeable even if previously recommended highly active accelerators such as tetramethyl thiuram monosulfide (TMT-MS) and tetramethylthiuram disulfide (TMT) are used with low sulfur concentrations of 0.75 to 1.5 parts by weight of sulfur per 100 parts of RHC. Frequently the vulcanizates prepared from such compounds show unsatisfactory results with regard to abrasion resistance and heat development, so that they are in many cases not suitable for use in pneumatic tires, and especially for treads, in spite of good properties referred to above. The unvulcanized compounds have very low building tack to similar compounds as well as to compounds of other elastomers, so that the usual building methods can be used only with difficulty. It has also been shown that the assembly of vulcanizable articles from parts containing EPDM and parts containing other elastomers of higher unsaturation is frequently difficult because of poor knitting together of the various parts on curing. Tests have shown that such assemblies in many cases are subject to rapid destruction at the boundary surfaces under dynamic load.

It is also known to extend EPDM by suitable oils and to prepare vulcanizable articles therefrom. It has been possible by the use of previously known compounding methods to achieve no improvement or no sufficient improvement in the unsatisfactory values of the above properties except a lowering of compound costs.

The addition of other, more highly unsaturated, elastomers to EPDM compounds has therefore been attempted. This has amounted in some cases to an attempt to dilute EPDM with such other elastomers. This can lead to processing difficulties and new disadvantages related thereto in the properties of vulcanizates prepared from such mixtures. Such mixtures sometimes display poor dispersibility of elastomers and other components and a corresponding non-homogeneity regardless of the use of a mill or a Banbury for mixing. In vulcanization of such mixtures, the EPDM content is undercured when the other elastomers, for example natural rubber, are already strongly overcured because of the extreme variation in curing rates of the various elastomers.

This phenomenon may be very clearly observed if the above-mentioned accelerators TMT-MS and TMT are used. These are the accelerators previously recommended for the vulcanization of EPDM. As a result of the above-mentioned non-homogeneity and the varying states of cure test samples sometimes show complete destruction after very short periods of dynamic stress. It has therefore been desired to improve such mixtures and dilutions prepared according to the prior art recipes for use in highly stressed rubber articles such as pneumatic tires.

It is an object of the invention to overcome the problems which sometimes arise in the vulcanization of mixtures of the useful EPDM elastomers and the more highly unsaturated rubbers used to an overwhelming degree to date and simultaneously to obtain co-vulcanizates superior in the sum of their properties to previously known vulcanizates. A method of overcoming the difficulties of the co-vulcanization of the elastomer types named has now been discovered in accordance with the above object, so that desired co-vulcanizates with improved properties can be made available to commerce.

Accordingly, the subject of the present invention is a process for the vulcanization of mixtures of ethylene-propylene terpolymers and elastomers of higher unsaturation with sulfur and accelerators to yield vulcanizates of improved properties. The invention is characterized by the use of accelerators with a definitely delayed action and correspondingly long scorch periods in the unvulcanized compounds together with non-excessive rates of scorch.

Although the use of highly active accelerator systems for the vulcanization of comparatively unreactive EPDM elastomers has usually been proposed up to the present time, it has now unexpectedly been discovered that the use of exactly these systems for the co-vulcanization of EPDM with elastomers of higher unsaturation is undesirable. In contrast to previous practice and in accordance with the present invention, it is actually preferred to use delayed action accelerators in combination with vulcanization retarders.

The concept of "delayed action accelerators" is a concept which is generally known to those skilled in the art. It refers to accelerators which initiate the vulcanization reaction after a definite induction period (compare hereto, for example "Bayer Handbook for the Rubber Industry" of Oct. 1, 1963 at page 119 or "British Compounding Ingredients for Rubber" 1958 at page 31 or "Compounding Ingredients for Rubber," U.S.A., 1961 at page 51). The previously known compounds benzothiazyl-2-sulfenmorpholide ("Vulkacit MOZ") and N-t-butyl-2-benzothiazyl sulfenamide ("Santocure NS") have shown themselves to be useful in the method of the present invention either alone or in combination with smaller quantities of basic accelerators of the guanidine type for example, diphenyl guanidine ("Vulkacit D") (e.g. 0.1 to 0.5 part per 100 parts by weight of rubbers). Other accelerators useful in the present invention are those of the sulfenamide type such as the commercial product known as "Vulkacit DZ." There may also be mentioned, by way of non-limiting example, such materials as N,N'-diethyl-benzothiazole-2-sulfenamide, N,N-diisopropyl-benzothiazole-2-sulfenamide, N-cyclohexyl-benzothiazole-2-sulfenamide, and N-oxydiethylene-benzothiazole-2-sulfenamide. These or any other conventional accelerators with clearly delayed action may be employed in the invention, in conventional amounts, frequently from 0.3 to 1 part per 100 parts by weight of rubbers.

The concept of "retarders" is also well known to those skilled in the art. In this regard, reference is made to "Bayer Handbook for the Rubber Industry" Oct. 1, 1963, page 157, as well as "British Compounding Ingredients for Rubber" 1958, page 244. This concept refers to compounds such as, for example, diphenylnitrosamine ("Vulkalent A") or phthalic anhydride, which do not retard the vulcanization rate but which do occasion a further extension of the induction period. Other retarders which may be mentioned, by way of non-limiting example, include maleic acid, malic acid, sodium acetate, mixed aliphatic amines, salicylic acid and benzoic acid. Any conventional retarder may be used, in conventional amounts; e.g. 0.1 to 1 part per 100 parts by weight of rubbers.

Regardless of which compounds are used in accordance with the present invention with sulfur for the vulcanization or for the onset of the vulcanization after the induction period, it is important for the method of the present invention to control the scorch rate in a definitely determinable way. The determination of the scorch rate is made by means of the Mooney Plastometer in accordance with DIN 53524 of December 1960 or ASTM D–1646–59T (1959). For a working temperature of 130° C. and an L-Rotor, the following measurements are preferred:

$t5$ at least 10 minutes, preferably at least 15 minutes, especially 15 to 25 minutes;
$t35$ at least 15 minutes, preferably at least 18 minutes, especially 18 to 30 minutes.

The scorch rate V (meaning the increase of 30 Mooney units divided by [$t35$ minus $t5$]) should preferably not exceed the value of 20/minute. Preferably this will be at least 7/minute, more preferred at least 10/minute and especially preferred 10 to 15/minute.

By experiment, it was determined that if the above ranges were respected in carrying out a co-vulcanization in accordance with the present invention, and extension of the vulcanization period of the mixture is not necessary even though expected from the prior art. The EPDM portion of the co-vulcanizate was found to vulcanize just as fast as the other elastomers of higher unsaturation even though the EPDM otherwise vulcanizes especially slowly. It therefore follows that the state of cure of the co-vulcanizate is homogeneous. As a consequence, appreciably better physical-mechanical properties are obtained in the co-vulcanizate. This aspect of an accelerator system with an induction period on a mixture of elastomers consisting of EPDM and more highly unsaturated rubbers is totally unexpected and novel.

The scorch times ($t5$ and $t35$) and the scorch rate [$30/(t35-t5)$] with any given blend of the invention containing a particular kind of EPDM and a particular highly unsaturated elastomer, in given proportions, will depend mainly, as will be appreciated by those skilled in the art, on the particular delayed action accelerator employed and the amount thereof (as well as the amount of sulfur) as well as the particular retarder employed and the amount thereof (and also on the presence or absence of other substances affecting the induction period or rate of cure, such as basic accelerators). By suitable selection of the materials and amounts thereof and by carrying out the Mooney plastometer scorch test, those skilled in the art will be enabled to provide numerous compositions of the invention having the characteristics desired for various applications.

The EPDM types used in the present invention have an unsaturation of at least 1.2 mole percent and preferably at least 1.5 mole percent. Especially good results are obtained with EPDM types which have unsaturations of 2.0 to 2.5 mole percent. In admixture with EPDM are used the normal elastomers of higher unsaturation which are the usual materials used in the vulcanization of rubber.

Examples of the more unsaturated elastomers are natural rubber, polyisoprene, SBR, the polybutadiene rubbers (Cis-BR and EBR). One or more of these elastomers of higher unsaturation may be used with EPDM in the curing system of the present invention. In general the highly unsaturated elastomers may be defined as rubbery polymers containing at least 50% by weight of combined diene, usually a conjugated diolefin, whether a homopolymer, or a copolymer with at least one copolymerizable monoethylenically unsaturated monomer (e.g. styrene, acrylonitrile, vinyl pyridine, acrylate esters, acrylic acid, etc.).

In accordance with the present invention, it is also preferred to use extender oils with the elastomeric mixtures. The extender oils assist mixing and are therefore important for the homogeneity of the mixtures of the present invention. The oil can be added in masterbatch form or as such. If the oil is to be added as such, it is preferably added to the EPDM before the other elastomers are mixed in. This can be done, for example, in an internal mixer at temperatures from 120 to 160° C., whereby it is well to add the total oil in several portions (for example two approximately equal portions), whereby each portion is almost completely mixed before the next portion is added. These well known extender oils are usually hydrocarbon fractions, for example petroleum hydrocarbon fractions, with a high boiling point and high flash and flame points, they are usually primarily naphthenic and/or aromatic compounds. It is preferred that at least 10 parts by weight of extender oil per 100 parts of elastomeric mixture be used. Preferably at least 20 parts by weight of extender oil are used. Compounds of this type give good dispersion and homogeneity as well as sufficient building tack. Larger amounts of oil, such as 50 or 100 or more parts, may be used.

The sulfur content, in accordance with the present invention, is not usually higher than 2 to 2.5 parts by weight per 100 parts of rubber and preferably somewhat less. Especially good is, for example, a sulfur content of 1.2 to 1.8 parts by weight per 100 parts of total rubber. Lesser amounts, such as 1 part, may be used.

Active or highly active reinforcing fillers alone or in combination with non-reinforcing fillers may be added in the usual way to the combination of the present invention. Proportions from 20–60 parts by weight, preferably 20–40 parts by weight per 100 RHC of reinforcing fillers may be used with advantage. As reinforcing fillers, the well known carbon blacks as well as silica, aluminum silicates and/or zinc oxide may, for example, be used. As non-reinforcing fillers, one or more of the many types known to the art may be used.

If an improvement in building tack is desired, this may be obtained by the admixture of adhesive resins which may be of the phenol-formaldehyde type (for example that sold under the trade name "Amberol ST 137X"). About 1 to 5 parts of adhesive resin per 100 parts of RHC are suitable.

In the practice of the co-vulcanization of the present invention, an additional very important and surprising further result was found:

It was found that the physical and mechanical properties of the vulcanizates of the present invention were very greatly changed toward those of pure EPDM vulcanizates even though the proportion of EPDM in the total RHC was still comparatively small. The product properties are not the average properties expected. Even small quantities of EPDM give considerable improvements in the properties of the vulcanizates. It can therefore be preferred that mixtures be used in the practice of the present invention which contain relatively small proportions of EPDM and relatively large proportions of elastomers of higher unsaturation. While this is not necessary for the practice of the invention it can, at the same time, represent a considerable advantage. The good physical and mechanical properties of the EPDM content thereby are effective to an unexpected degree. In this regard it is preferred, in accordance with the present invention, that the RHC content be from 10 to 60% EPDM and preferably less than 50% EPDM.

The vulcanizates of the present invention have, in addition to excellent aging resistance, very good fatigue properties and show improvements in abrasion resistance and less heat development in comparison to pure EPDM vulcanizates. Excellent test results were obtained in relation to fatigue resistance with drynamic stress and aging. The assembly of vulcanizable products from parts of differing chemical nature and especially their assembly with parts of the usual rubbers presents no difficulty because of the mutual tolerance of the various parts. This is especially important for the production of highly stressed rubber articles such as pneumatic tires in which the mixtures of the present invention can be used with special advantage.

EXAMPLE

In the following tables, several recipes representative of the invention are given and the values of various physical and mechanical properties of vulcanizates prepared therefrom are compared with a standard.

|  | Parts by weight | | | |
|---|---|---|---|---|
| Recipe No. | 1 | 2 | 3 | 4 |
| Natural rubber | 30 | 30 | 30 | 30 |
| Styrene butadiene rubber (SBR 1712) [1] | 68.75 | 68.75 | | |
| Emulsion polybutadiene ("Synpol 8407") [2] | | | 68.75 | 68.75 |
| Ethylene-Propylene-terpolymer [3] | 30 | 30 | 30 | 30 |
| Carbon black (ISAF) | 20 | 20 | 20 | 20 |
| Carbon black (SRF) | 30 | 30 | 30 | 30 |
| Zinc oxide | 3 | 3 | 3 | 3 |
| Stearic acid | 1 | 1 | 1 | 1 |
| "Santocure NS" [4] | 0.6 | 0.5 | | |
| "Vulkacit MOZ" [5] | | | 0.8 | 0.6 |
| "Vulkacit D" [6] | 0.2 | 0.2 | 0.2 | 0.2 |
| "Santoflex AW" [7] | 1.5 | 1.5 | 1.5 | 1.5 |
| Antioxidant "4010/NA" [8] | 1 | 1 | 1 | 1 |
| "Vulkalent A" [9] | 0.3 | 0.3 | 0.3 | 0.3 |
| Sulfur | 2.0 | 1.5 | 1.8 | 1.5 |
| Total | 188.35 | 187.75 | 188.35 | 187.85 |
| Total oil content | 28.75 | 28.75 | 28.75 | 28.75 |

[1] This material is oil extended and contains 37½ parts of highly aromatic oil per 100 RHC.
[2] This material is oil extended and contains 37½ parts of highly aromatic oil per 100 RHC.
[3] This material is oil extended and contains 50 parts of naphthenic oil per 100 RHC. The unsaturation is 2.1 mol percent, derived for example from dicyclopentadiene, E/P ratio for example 65/35.
[4] "Santocure NS" is N-t-butyl-2-benzothiazyl sulfenamide.
[5] "Vulkacit MOZ" is benzothiazyl-2-sulfenmorpholide.
[6] "Vulkacit D" is diphenyl guanidine.
[7] "Santoflex AW" is 6-ethoxy-1,2-dihydro-2,2,4-trimethylquinoline.
[8] "Antioxidant 4010/NA" is N-phenyl-N-isopropyl-p-phenylenediamine.
[9] "Vulkalent A" is diphenylnitrosamine.

CURING BEHAVIOR

| Recipe No. | M-visc. 100° C. | M-visc. 130° C. | Induction period | t5 min. | t35 min. | t min. | V₋₁ min. |
|---|---|---|---|---|---|---|---|
| 1 | 44 | 31 | 15 | 16.6 | 18.6 | 2.0 | 15.0 |
| 2 | 46 | 35 | 16.8 | 18.6 | 20.9 | 2.3 | 13.1 |
| 3 | 47 | 40 | 17.1 | 19.7 | 22.4 | 2.7 | 11.1 |
| 4 | 45 | 33 | 22.5 | 25.1 | 28.2 | 3.1 | 9.7 |
| Standard | 41 | 35 | 10.9 | 13.4 | 15.4 | 2.0 | 15.0 |

For comparative purposes, a normal passenger tire sidewall compound containing 20 NR, 80 SBR, 56 carbon black (active and semi-active) and 12½ added oil was used.

PHYSICAL TEST RESULTS FOR VULCANIZATES CURED 10 MIN. AT 165° C.

| Recipe No. | 1 | 2 | 3 | 4 | Standard |
|---|---|---|---|---|---|
| Elasticity at break, percent | 614 | 637 | 530 | 650 | 572 |
| Tensile, kp./cm.² | 97 | 95 | 94 | 90 | 113 |
| Modulus 300%, kp./cm.² | 30 | 28 | 39 | 26 | 52 |
| Tear Resistance, kp./cm.² | 16 | 23 | 13 | 20 | 13 |
| Hardness Shore A, deg. | 44 | 41 | 46 | 42 | 52 |
| Rebound, percent | 42 | 38 | 42 | 39 | 32 |
| De Mattia at 20° C. | | | | | |
| Initial cut length, 2 mm. | | | | | |
| No. of flexes × 1,000: | | | | | |
| 5 | 2.05 | 2.02 | 2.00 | 2.00 | 2.62 |
| 10 | 2.15 | 2.12 | 2.05 | 2.00 | 5.00 |
| 50 | 2.90 | 2.52 | 2.13 | 2.00 | 10.00 |
| 100 | 3.25 | 3.00 | 2.30 | 2.00 | 13.40 |
| 150 | 3.65 | 3.50 | 2.40 | 2.00 | 16.00 |
| 200 | 4.00 | 4.00 | 2.50 | 2.00 | 18.00 |

External test of Du Pont rings at a test length of 480 hrs. in a turned over position at 75% extension—no damage.

Having thus described our invention, what we claim and desire to protect by Letters Patent is:

1. A method of vulcanizing a blend of:
  (A) from 10% to 60% by weight of EPDM and, correspondingly,
  (B) from 90% to 40% by weight of a mixture of natural rubber and another highly unsaturated elastomer, wherein the said EPDM is a sulfur-vulcanizable elastomeric terpolymer of ethylene, propylene, and a copolymerizable non-conjugated diene, the amount of said diene in the EPDM being from 1.2 to 10 mole percent, and wherein the said other highly unsaturated elastomer is a sulfur-vulcanizable rubbery polymer containing at least 50% by weight of a conjugated diolefin combined therein, comprising mixing the said blend with
  (a) from 1.2 to 5 parts of sulfur,
  (b) from 0.3 to 1 part of a delayed action accelerator of sulfur vulcanization,
  (c) from 0.1 to 0.5 parts of diphenyl guanidine and
  (d) from 0.1 to 1 part of a retarder of sulfur-vulcanization, the said accelerators (b) and (c) being the sole accelerators present, the said parts being by weight per 100 parts by weight of (A) plus (B) to provide a composition having the following Mooney plastometer scorch properties at 130° C. with an L-Rotor:
  t5 of 10 to 25 minutes
  t35 of 15 to 30 minutes
  scorch rate from 7 per minute to 15 per minute, and thereafter heating the resulting composition at vulcanizing temperature until the composition is vulcanized.

2. A method as in claim 1, in which the delayed action accelerator is a sulfenamide accelerator.

3. A method as in claim 1 in which the said non-conjugated diene is dicyclopentadiene.

4. A method as in claim 1 in which the said other highly unsaturated elastomer in (B) is butadiene-styrene copolymer rubber.

5. A method as in claim 1 in which the blend further contains from 10 to 100 parts by weight of extender oil.

6. The vulcanizate resulting from the method of claim 1.

References Cited

UNITED STATES PATENTS 3,343,582  9/1967  Himes et al. _____ 260—889
3,356,764  12/1967  Gentile _____ 260—889

MORRIS LIEBMAN, *Primary Examiner.*

S. L. FOX, *Assistant Examiner.*

U.S. Cl. X.R.

260—5, 41.5, 889

UNITED STATES PATENT AND TRADEMARK OFFICE
CERTIFICATE OF CORRECTION

PATENT NO. : 3,451,962
DATED : June 24, 1969
INVENTOR(S) : Hans W. Auler and Gerhard Proske It is certified that error appears in the above-identified patent and that said Letters Patent are hereby corrected as shown below:

Col. 6, line 30, for "mole percent" read --mole-percent--; line 35, for "5 parts" read --2.5 parts--.

Signed and Sealed this

Tenth Day of August 1976

[SEAL]

Attest:

RUTH C. MASON
Attesting Officer

C. MARSHALL DANN
Commissioner of Patents and Trademarks